United States Patent
Sugiyama et al.

(10) Patent No.: US 9,385,465 B2
(45) Date of Patent: Jul. 5, 2016

(54) TERMINAL SPACER

(71) Applicant: Yazaki Corporation, Tokyo (JP)

(72) Inventors: Daisuke Sugiyama, Shizuoka (JP);
Takashi Tsukamoto, Shizuoka (JP);
Junichi Watanabe, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/674,056

(22) Filed: Mar. 31, 2015

(65) Prior Publication Data

US 2015/0207260 A1 Jul. 23, 2015

Related U.S. Application Data

(63) Continuation of application No. PCT/JP2013/077091, filed on Oct. 4, 2013.

(30) Foreign Application Priority Data

Oct. 5, 2012 (JP) .................................. 2012-222934

(51) Int. Cl.
*H01R 13/595* (2006.01)
*H01R 13/502* (2006.01)
*B60L 11/18* (2006.01)
(Continued)

(52) U.S. Cl.
CPC .......... *H01R 13/502* (2013.01); *B60L 11/1818* (2013.01); *H01R 13/426* (2013.01); *H01R 13/516* (2013.01); *B60L 2230/12* (2013.01); *B60L 2270/32* (2013.01); *B60L 2270/34* (2013.01); *H01R 4/184* (2013.01); *H01R 13/5205* (2013.01); *Y02T 10/7005* (2013.01);
(Continued)

(58) Field of Classification Search
CPC ............. H01R 13/562; H01R 13/5833; H01R 13/595; H01R 9/0521; H01R 2103/00
See application file for complete search history.

(56) References Cited

U.S. PATENT DOCUMENTS 2,573,600 A * 10/1951 Pruehs ................. H02G 3/0633
16/2.5
2,774,948 A * 12/1956 Wendel ................ H01R 13/562
439/447

(Continued)

FOREIGN PATENT DOCUMENTS

CN    1747237 A    3/2006
CN    101399419 A   4/2009
(Continued)

OTHER PUBLICATIONS

International Search Report of PCT/JP2013/077091 dated Dec. 10, 2013 [PCT/ISA/210].

(Continued)

*Primary Examiner* — Gary Paumen
(74) *Attorney, Agent, or Firm* — Sughrue Mion, PLLC (57) ABSTRACT

A terminal spacer having a cylindrical shape is attached to the circumference of an electric wire connected to a charge terminal. The terminal spacer includes a slit portion extending across the entire length in the axial direction of the terminal spacer. The slit portion includes an electric wire insertion slit portion into which the electric wire can be inserted, and a narrow slit portion continuously extending from the electric wire insertion slit portion and having an opening width narrower than that of the electric wire insertion slit portion.

7 Claims, 8 Drawing Sheets

(51) Int. Cl.
*H01R 13/426* (2006.01)
*H01R 13/516* (2006.01)
*H01R 4/18* (2006.01)
*H01R 13/52* (2006.01)

(52) U.S. Cl.
CPC ............ *Y02T 10/7088* (2013.01); *Y02T 90/121* (2013.01); *Y02T 90/14* (2013.01)

(56) References Cited

U.S. PATENT DOCUMENTS

| | | | |
|---|---|---|---|
| 3,245,030 A | 4/1966 | D'Amico | |
| 3,402,382 A * | 9/1968 | De Tar | H01R 13/42 439/469 |
| 4,846,706 A * | 7/1989 | Lee | H01R 24/28 439/104 |
| 6,341,881 B1 * | 1/2002 | Huang | F21S 4/003 362/249.01 |
| 6,582,248 B2 * | 6/2003 | Bachman | H01R 13/516 439/447 |
| 2002/0076331 A1 | 6/2002 | Eckert et al. | |
| 2003/0100215 A1 | 5/2003 | Bachman | |
| 2011/0287649 A1 | 11/2011 | Kurumizawa et al. | |

FOREIGN PATENT DOCUMENTS

| | | |
|---|---|---|
| CN | 101573839 A | 11/2009 |
| EP | 0993075 A2 | 4/2000 |
| JP | 62-127682 U | 8/1987 |
| JP | 08-106932 A | 4/1996 |
| JP | 8-222330 A | 8/1996 |
| JP | 10-172628 A | 6/1998 |
| JP | 11-8922 A | 1/1999 |
| JP | 2004-327266 A | 11/2004 |
| JP | 3147004 U | 12/2008 |
| JP | 2009-238465 A | 10/2009 |
| JP | 2011-244590 A | 12/2011 |

OTHER PUBLICATIONS

Communication dated May 4, 2016 from the State Intellectual Property Office of the P.R.C. issued in Chinese Application No. 201380051039.

Communication dated May 9, 2016 from the European Patent Office issued in corresponding Application No. 13844370.0.

* cited by examiner

TERMINAL SPACER

CROSS REFERENCE TO RELATED APPLICATION

This is a continuation application based on PCT application No. PCT/JP2013/077091 filed on Oct. 4, 2013, which claims the benefit of priority from Japanese Patent Application No. 2012-222934 filed on Oct. 5, 2012, the entire contents of which are incorporated by reference herein.

BACKGROUND OF THE INVENTION

1. Field of the Invention

The present invention relates to a terminal spacer to be attached to a circumference of an electric wire connected to a terminal.

2. Description of the Related Art

There has been known a charge connector or a charge inlet device for charging a battery installed in a vehicle such as an electric vehicle (EV) or a hybrid electric vehicle (HEV) (for example, refer to Japanese Unexamined Patent Application Publication No. 2011-244590 (FIG. 2 to FIG. 4)). Such a charge connector or charge inlet device may use a terminal spacer for positioning and fixing a terminal to a housing. An example of the terminal spacer will be described below with reference to FIG. 1.

Figure 1:
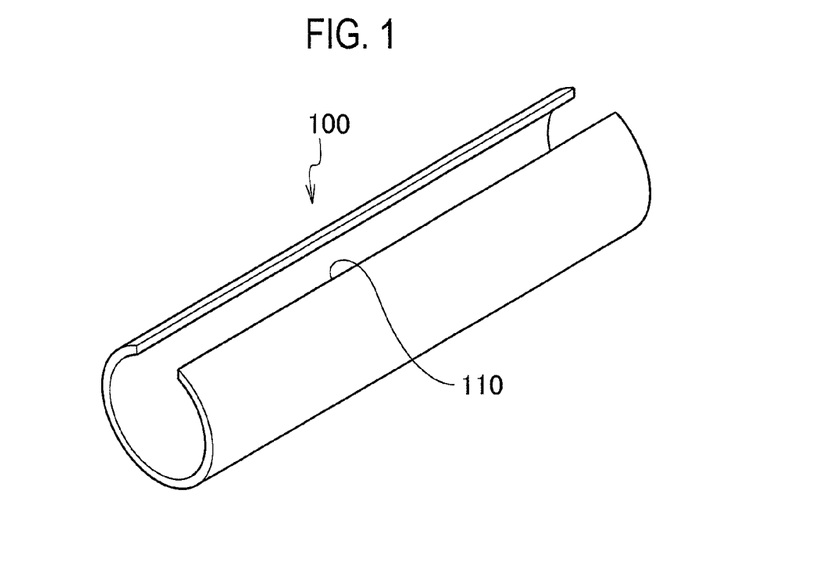
FIG. 1 is a perspective view showing a terminal spacer according to prior art.

As shown in FIG. 1, a terminal spacer 100 is formed into a cylindrical shape. The terminal spacer 100 is provided with a slit 110 (a gap) extending across the entire length in the axial direction of the cylindrical shape thereof. The slit 110 is formed to have a uniform opening width along the entire length.

The terminal spacer 100 is attached to an end portion of an electric wire (not shown in the figure) in a manner such that the end portion of the electric wire is connected to an electric wire connecting portion of a terminal and is then inserted into the terminal spacer 100 from the slit 110 so that the electric wire connecting portion of the terminal is partly covered with the terminal spacer 100. The terminal spacer 100 facilitates the attachment operation since the electric wire can be attached with the terminal spacer 100 after the connection of the electric wire to the terminal.

However, the terminal spacer 100 may easily come off the end portion of the electric wire and the electric wire connecting portion of the terminal through the slit 110 because of the opening thereof regardless of whether the terminal spacer 100 is elastically deformed. If the opening width of the slit 110 is decreased or the slit 110 is formed with almost no opening in order to prevent the terminal spacer 100 from easily coming off the end portion of the electric wire and the electric wire connecting portion of the terminal, the operation performance of attaching the terminal spacer 100 to the end portion of the electric wire deteriorates.

SUMMARY OF THE INVENTION

The present invention has been made in order to solve the above-mentioned problem. An object of the present invention is to provide a terminal spacer facilitating an operation of attachment to a terminal and not easily coming off the terminal after the attachment thereto.

According to a first aspect of the present invention, there is provided a terminal spacer having a cylindrical shape to be attached to a circumference of an electric wire connected to a terminal, the terminal spacer comprising a slit portion extending across the entire length in an axial direction of the terminal spacer, the slit portion including: an electric wire insertion slit portion into which the electric wire can be inserted; and a narrow slit portion continuously extending from the electric wire insertion slit portion and having an opening width narrower than that of the electric wire insertion slit portion.

According to a second aspect of the present invention, the electric wire insertion slit portion is open to an end surface of the terminal spacer on one side in the axial direction.

According to a third aspect of the present invention, the electric wire insertion slit portion has a tapered surface having an opening width which gradually decreases toward the narrow slit portion.

According to a fourth aspect of the present invention, the end surface of the terminal spacer is provided with a receiving wall portion projecting in an inner circumferential direction.

According to the present invention, the terminal spacer can be attached to the electric wire in a manner such that the electric wire is inserted from the electric wire insertion slit portion having a wider opening width than the narrow slit portion, and the partly-inserted electric wire is pushed against the narrow slit portion to open it so that the electric wire enters the terminal spacer. Accordingly, an operator can attach the terminal spacer to the electric wire without applying excessive external force to the terminal spacer. In addition, the terminal spacer attached to the electric wire is prevented from easily coming off the electric wire due to the narrow slit portion provided in the slit portion of the terminal spacer, compared with the conventional case where the terminal spacer includes the electric wire insertion slit portion extending across the entire length thereof. Accordingly, the terminal spacer contributes to facilitating the operation of attachment to the terminal and does not easily come off the terminal after the attachment thereto.

DESCRIPTION OF THE EMBODIMENTS

The embodiment of a charge connector using a terminal spacer according to the present invention will be described below with reference to the drawings. Here, the same or similar elements in the following descriptions of the drawings are indicated by the same or similar reference numerals. It should be noted that the respective elements are schematically shown in the drawings, and dimensional ratios in the drawings are different from actual ratios. The specific dimensions thus should be taken into consideration in accordance with the following descriptions. In addition, the respective drawings may include the elements which are equivalent but differ in dimensional ratio.

(Configuration of Charge Connector)

Figure 2:
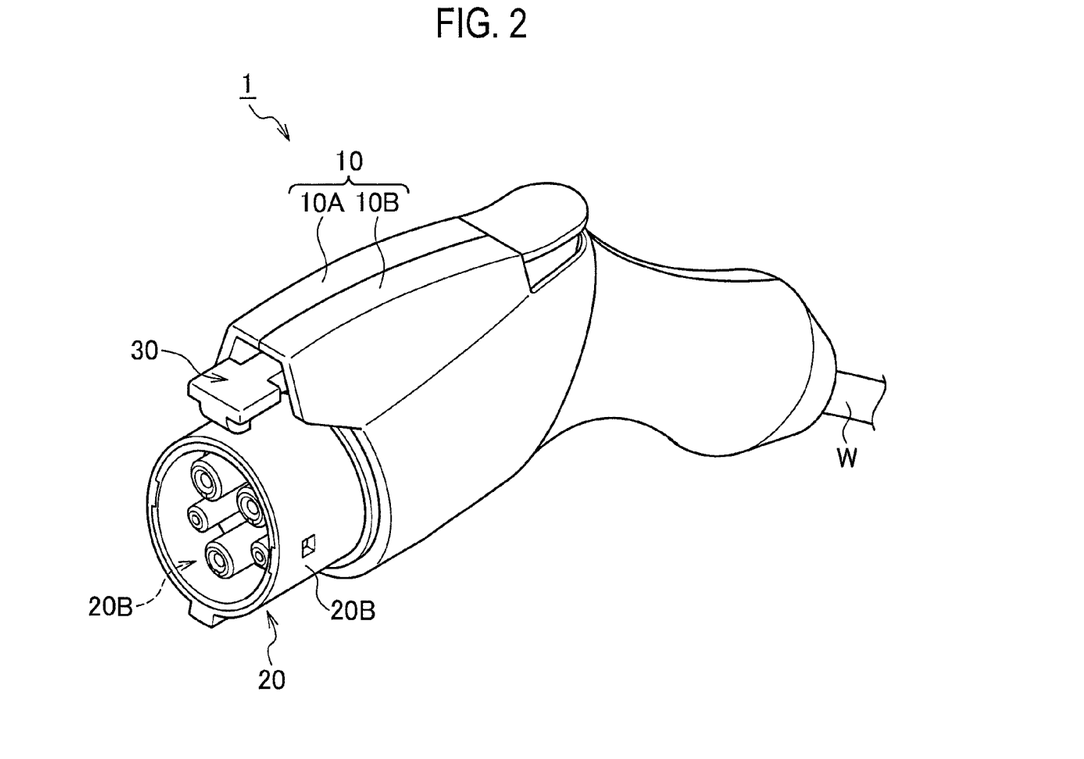
FIG. 2 is a perspective view showing a charge connector according to the present embodiment.
Figure 3:
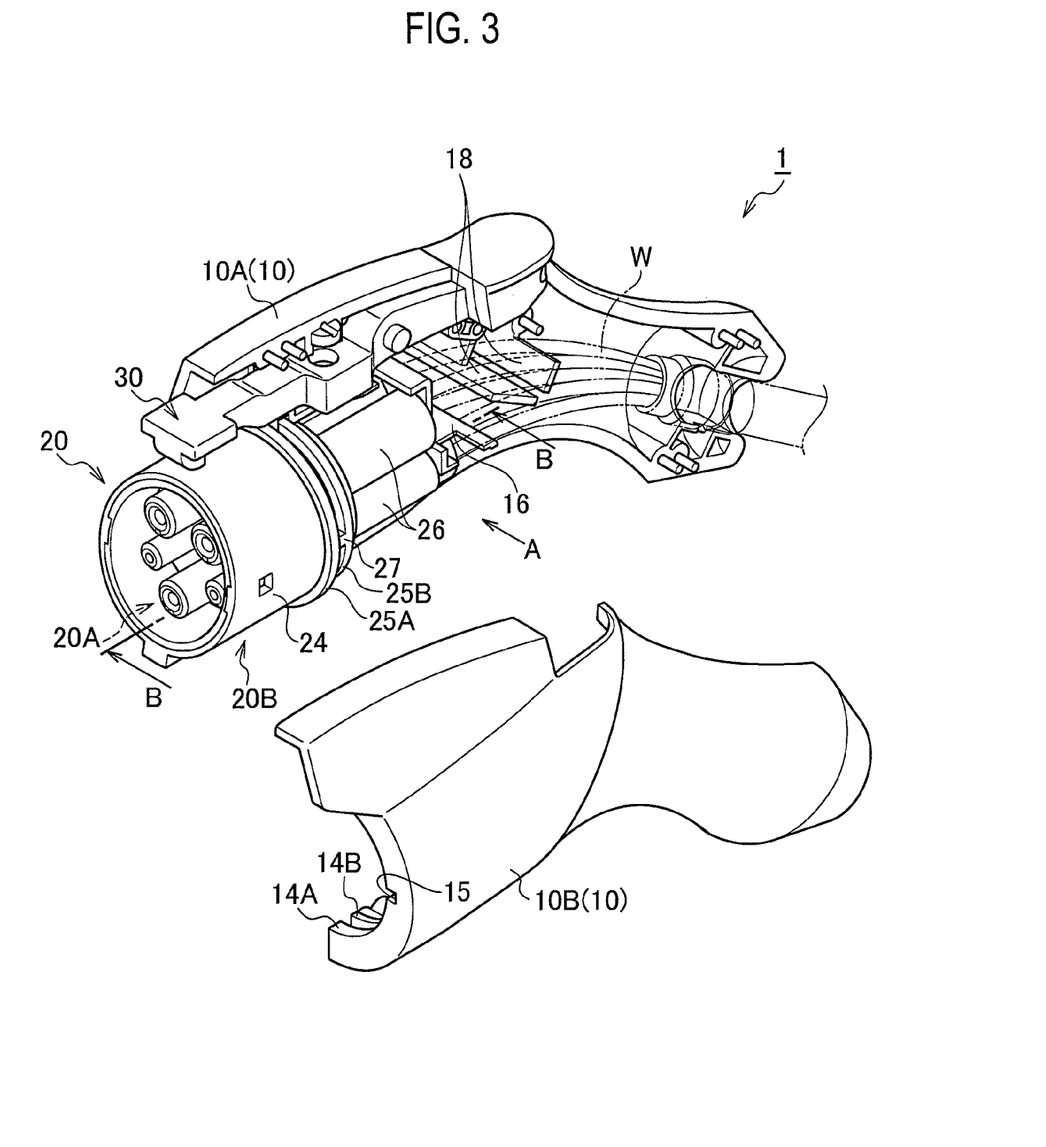
FIG. 3 is an exploded perspective view showing the charge connector (an exploded view showing one side of a case body) according to the present embodiment.
Figure 4:
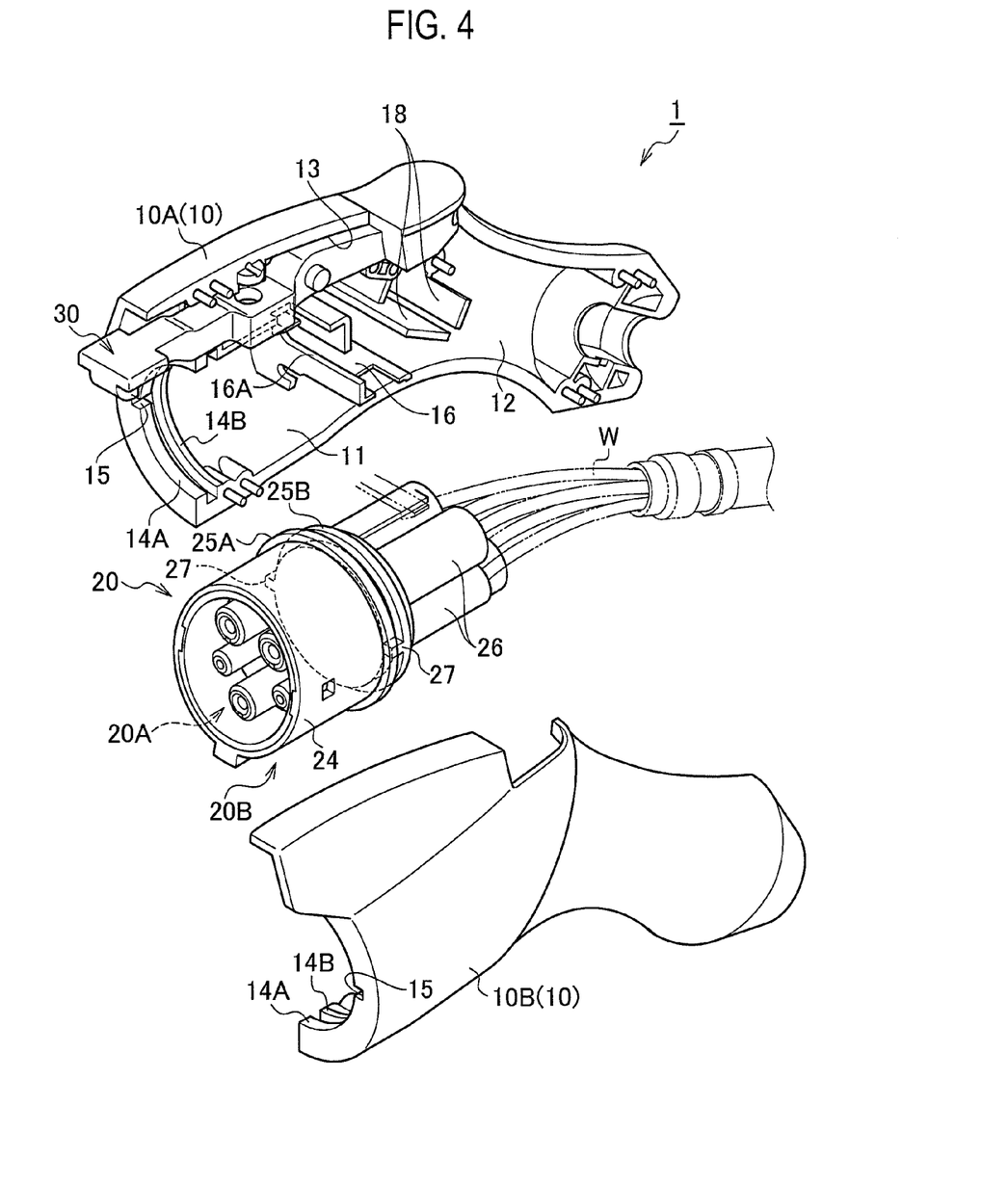
FIG. 4 is an exploded perspective view showing the charge connector (an exploded view showing both sides of the case body) according to the present embodiment.
Figure 5:
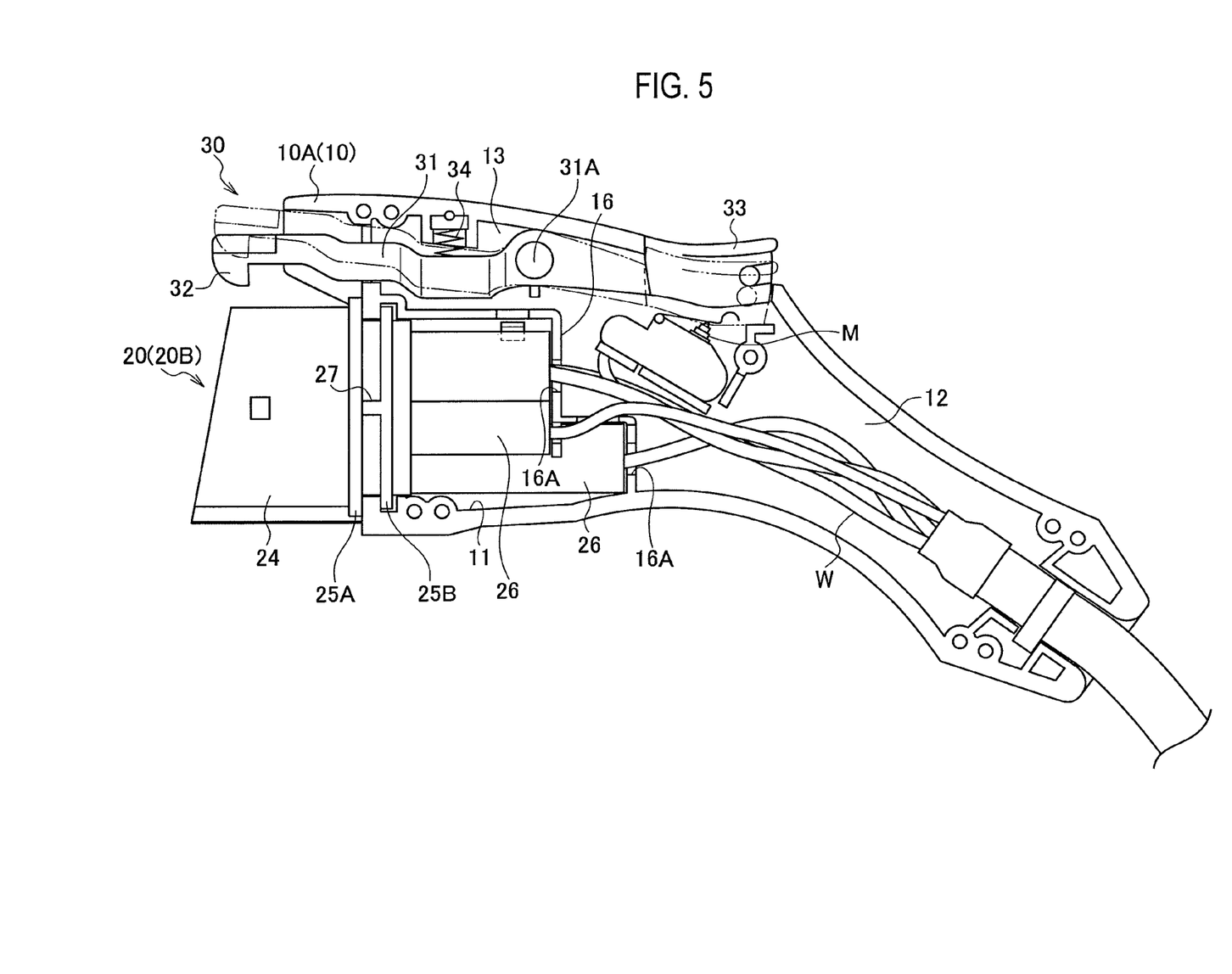
FIG. 5 is a cross-sectional view (viewed from an arrow A in FIG. 3) showing the inside of the charge connector 1 according to the present embodiment.

First, a configuration of a charge connector 1 according to the present embodiment will be described below with reference to the drawings. FIG. 2 is a perspective view showing the charge connector 1 according to the present embodiment. FIG. 3 and FIG. 4 are exploded perspective views each showing the charge connector 1 according to the present embodiment. FIG. 5 is a cross-sectional view (viewed from an arrow A in FIG. 3) showing the inside of the charge connector 1 according to the present embodiment.

As shown in FIG. 2 to FIG. 5, the charge connector 1 is configured to be fitted to a mating connector (a charge inlet device) provided with mating terminals. The charge connector 1 includes a connector case 10 including a pair of case split members 10A, 10B to be coupled together, a connector body 20 housed in the connector case 10 and including a plurality of charge terminals 20A connected with electric wires W and housed in a connector housing 20B, and a lock mechanism 30 capable of preventing the mating connector (not shown in the drawings) and the connector body 20 fitted together from separating from each other.

As shown in FIG. 4 and FIG. 5, the connector case 10 includes a housing keeping portion 11 for housing the connector housing 20B, an electric wire housing portion 12 for housing the electric wires W connected to the charge terminals 20A, and a lock housing portion 13 for housing the lock mechanism 30 above the housing keeping portion 11 and the upper portion of the electric wire housing portion 12.

As shown in FIG. 4 and FIG. 5, the housing keeping portion 11 includes two axial direction regulation ribs 14A, 14B elongated along the edge of the opening thereof. One axial direction regulation rib 14A is provided with rotation direction regulation holes 15 engaging with rotation direction regulation projections 27 (to be described below) of the connector housing 20B.

A terminal receiving wall 16 having a crank shape as viewed from the side is provided between the housing keeping portion 11 and the electric wire housing portion 12. The terminal receiving wall 16 is provided with electric wire insertion holes 16A through which the electric wires W connected to the charge terminals 20A located inside the connector housing 20B can pass.

Apart of the electric wire housing portion 12 serves as a handle which an operator holds. A switch holding base 18 for holding a micro switch M (refer to FIG. 5) is located between the electric wire housing portion 12 and the lock housing portion 13. The electric wires W connected to the charge terminals 20A of the connector body 20 extend below the switch holding base 18 and are drawn outward through the electric wire housing portion 12.

As described above, the connector body 20 includes the plural charge terminals 20A to be connected to the mating terminals of the mating connector (not shown in the drawings) and the connector housing 20B formed into a cylindrical shape housing the plural charge terminals 20A.

The charge terminals 20A are configured to be connected to the mating terminals of the mating connector (not shown in the drawings). The configuration of the charge terminals 20A will be described in detail below.

As shown in FIG. 3 to FIG. 5, the connector housing 20B includes an external hood 24 exposed to the outside of the connector case 10, to be fitted to the mating connector (not shown in the drawings), two fit ribs 25A, 25B formed on the rear side of the external hood 24 and fitted with the axial direction regulation ribs 14A, 14B, and a plurality of terminal housing portions 26 having a cylindrical shape extending from the inside of the external hood 24 toward the inner space of the connector case 10.

The rotation direction regulation projections 27 located between the two fit ribs 25A, 25B are inserted into and engage with the rotation direction regulation holes 15 provided at the housing holding portion 11. The plural terminal housing portions 26 respectively house the plural charge terminals 20A and are placed at intervals in the circumferential direction of the connector housing 20B.

The lock mechanism 30 prevents the mating connector (not shown in the drawings) and the connector housing 20B fitted together from separating from each other. As shown in FIG. 5, the lock mechanism 30 includes a lock arm 31, a lock claw 32 formed on the front side of the lock arm 31 to engage with the mating connector (not shown in FIG. 5), a lock operating portion 33 formed on the rear side of the lock arm 31 and used by the operator to operate the lock arm 31, and a coil spring 34 biasing the lock arm 31 toward a lock position (indicated by the solid line in FIG. 5).

The lock arm 31 is provided to be swingable about a swing fulcrum 31A between the lock position (indicated by the solid line in FIG. 5) where the lock claw 32 engages with the mating connector (not shown in the figure) and a release position (indicated by the two-dot chain line in FIG. 5) where the engagement between the mating connector and the lock claw 32 is released. The lock claw 32 and the lock operating portion 33 are exposed to the outside of the connector case 10. The lock operating portion 33 is operated to turn ON/OFF the micro switch M.

(Configuration of Charge Terminal)

Figure 6:
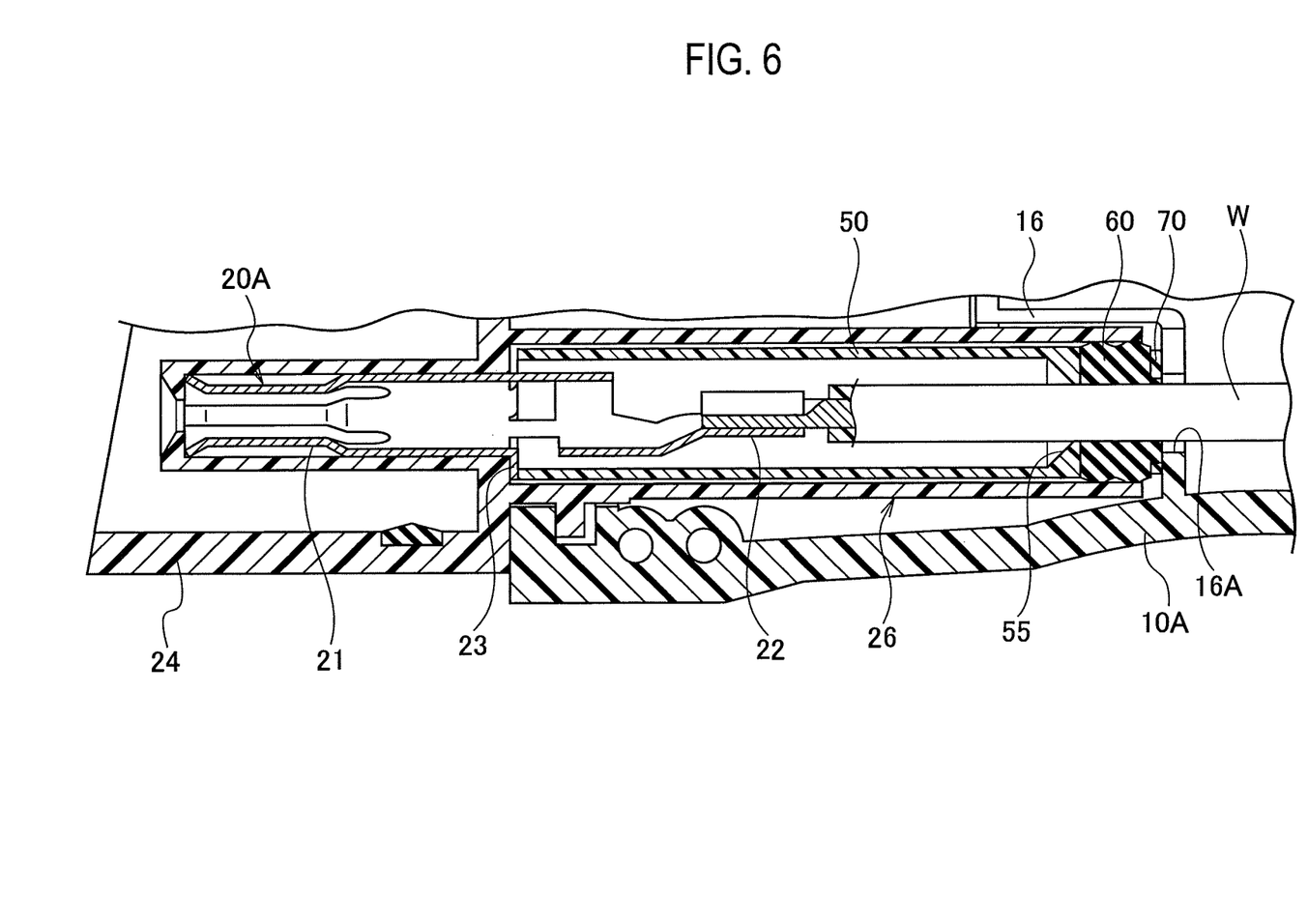
FIG. 6 is a cross-sectional view (taken along line B-B in FIG. 3) showing a charge terminal 20A according to the present embodiment.
Figure 7A:
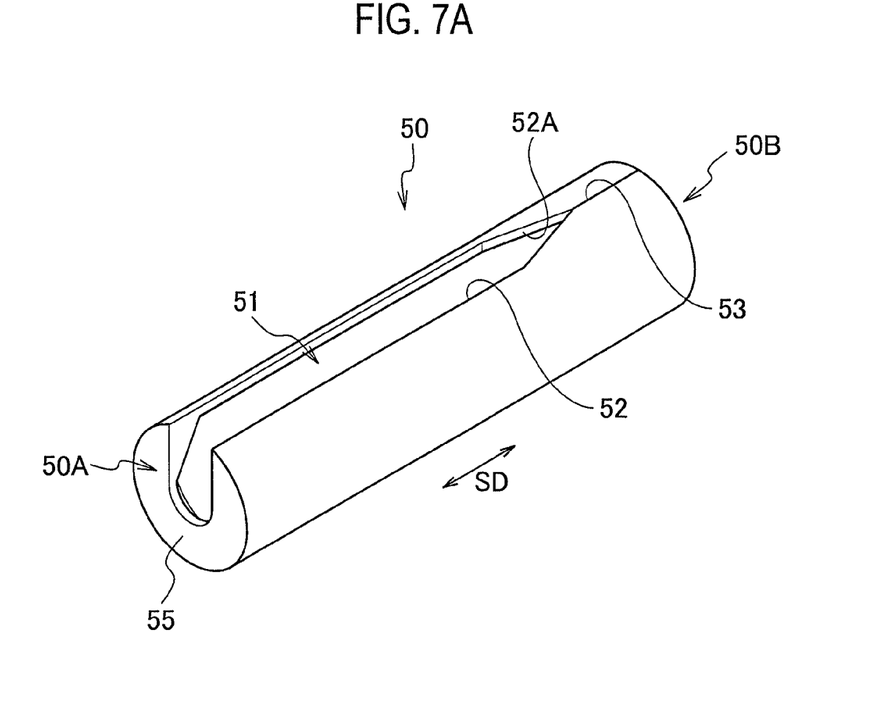
FIG. 7A is a perspective view showing a terminal spacer according to the present embodiment.
Figure 7B:
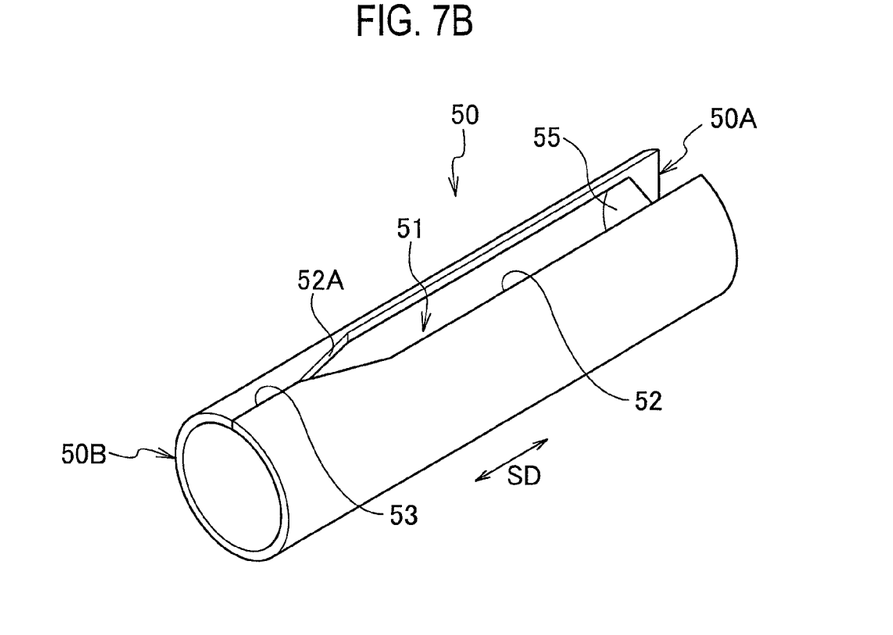
FIG. 7B is a perspective view showing the terminal spacer according to the present embodiment.

Next, the configuration of the charge terminal 20A described above will be described below with reference to FIG. 6, FIG. 7A and FIG. 7B. FIG. 6 is a cross-sectional view (taken along line B-B in FIG. 3) showing the charge terminal 20A according to the present embodiment. FIG. 7A and FIG. 7B are perspective views each showing a terminal spacer 50 according to the present embodiment.

As shown in FIG. 6, the charge terminal 20A includes a terminal connecting portion 21 to which a mating terminal (not shown in FIG. 6) is to be connected, an electric wire connecting portion 22 continuously extending from the terminal connecting portion 21 and connected with the electric wire W, and a contact claw 23 with which the terminal spacer 50 is brought into contact.

The electric wire W connected to the electric wire connecting portion 22 is attached with the terminal spacer 50, a waterproof rubber 60 attached to the rear end of the terminal spacer 50, and a rubber receiving plate 70 attached to the rear end of the waterproof rubber 60 to prevent the waterproof rubber 60 from entering the electric wire insertion hole 16A.

The charge terminal 20A to which the terminal spacer 50, the waterproof rubber 60 and the rubber receiving plate 70 are attached is housed in the connector housing 20B (the terminal housing portion 26 will be described below).

As shown in FIG. 6, FIG. 7A and FIG. 7B, the terminal spacer 50 is formed into a cylindrical shape and attached to the outer circumference of the electric wire W connected to the charge terminal 20A. The terminal spacer 50 is provided with a slit portion 51 (a gap) extending across the entire length in the axial direction of the cylindrical shape thereof (hereinafter, referred to as the axial direction SD of the terminal spacer 50).

The slit portion 51 includes an electric wire insertion slit portion 52 through which the electric wire W can be inserted, and a narrow slit portion 53 continuously extending from the electric wire insertion slit portion 52 and having an opening width narrower than that of the electric wire insertion slit portion 52.

The electric wire insertion slit portion 52 is formed to have an opening width wider than that of the narrow slit portion 53. The electric wire insertion slit portion 52 is open to an end surface 50A located on the rear side of the terminal spacer 50 in the axial direction SD. The end surface 50A includes a rubber receiving wall portion 55 extending toward the inner circumference of the cylindrical shape to come into contact with the waterproof rubber 60 (refer to FIG. 5).

The electric wire insertion slit portion 52 has a tapered surface 52A having an opening width which gradually decreases toward the narrow slit portion 53. The opening width of the electric wire insertion slit portion 52 excluding the tapered surface 52A is set to be greater than the diameter of the electric wire W. The opening width of the narrow slit portion 53 is set to be approximately zero.

The waterproof rubber 60 is made of a rubber material having less rigidity than the terminal spacer 50 and the rubber receiving plate 70 and is placed between the rubber receiving wall portion 55 of the terminal spacer 50 and the rubber receiving plate 70. The rubber receiving plate 70 is made of a resin material having higher rigidity than the waterproof rubber 60 and is placed between the terminal receiving wall 16 of the connector case 10 and the waterproof rubber 60.

(Attachment of Terminal Spacer)

Figure 8:
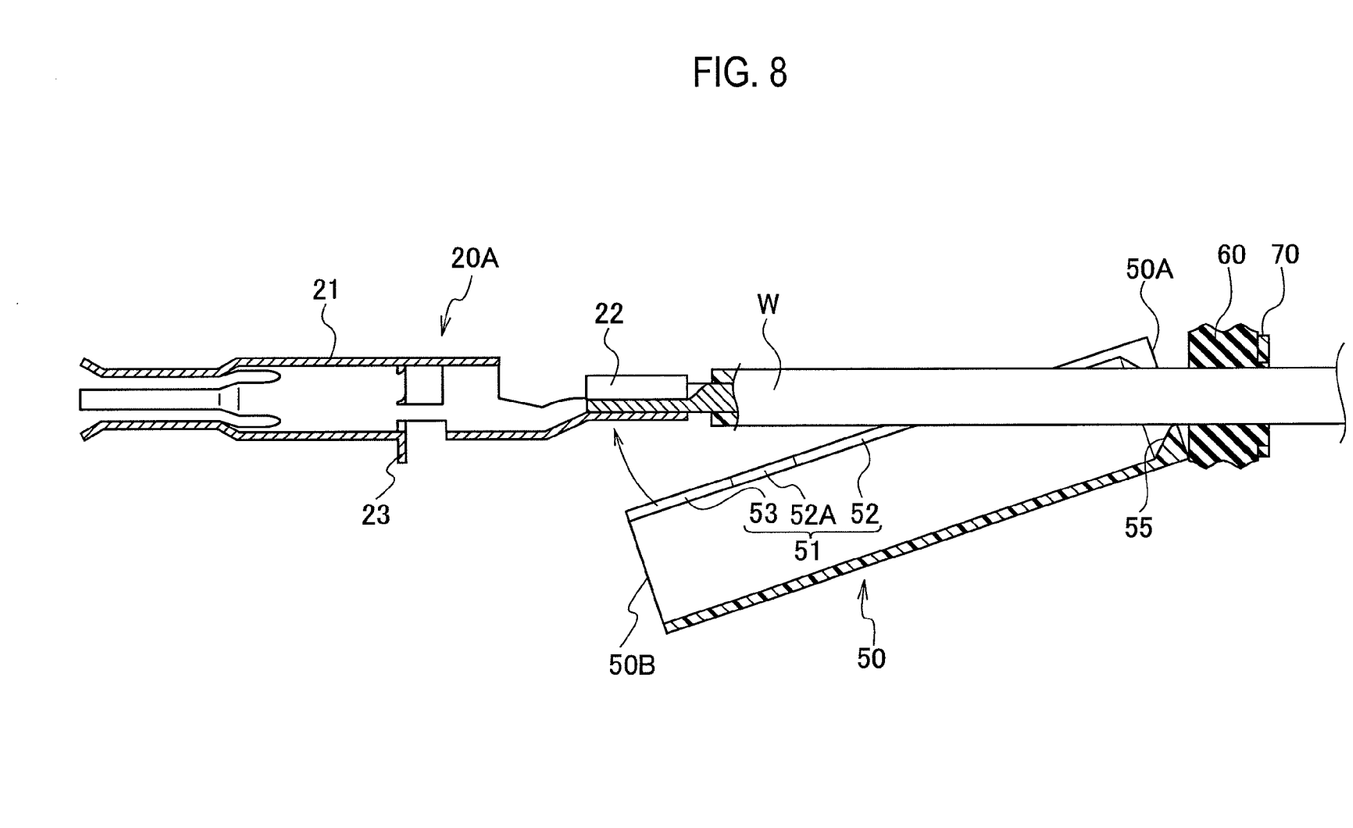
FIG. 8 is a view for explaining a process of attaching the terminal spacer according to the present embodiment to an electric wire.

Next, attachment of the terminal spacer 50 to the electric wire W will be described below with reference to FIG. 8. FIG. 8 is a view showing a process of attaching the terminal spacer 50 according to the present embodiment to the electric wire W.

First, the waterproof rubber 60 and the rubber receiving plate 70 are attached to the electric wire W, and the electric wire connecting portion 22 of the charge terminal 20A is then fastened on the end portion of the electric wire W.

Subsequently, as shown in FIG. 8, the electric wire W is inserted from the end surface 50A of the electric wire insertion slit portion 52, and the partly-inserted electric wire W is pushed against the tapered surface 52A and the narrow slit portion 53 in this order to open the narrow slit portion 53 so that the electric wire W enters the terminal spacer 50. Thus, the terminal spacer 50 is attached to the electric wire W with the electric wire connecting portion 22 of the charge terminal 20A partly covered.

Thereafter, the charge terminal 20A to which the terminal spacer 50, the waterproof rubber 60 and the rubber receiving plate 70 are attached, is housed in the terminal housing portion 26 (refer to FIG. 6). Accordingly, the charge terminal 20A is fixed inside the electric wire insertion slit portion 52. In addition, the waterproof rubber 60 is prevented from entering the terminal spacer 50 due to the rubber receiving wall portion 55 and prevented from entering the electric wire insertion hole 16A due to the rubber receiving plate 70.

(Effects)

According to the present embodiment, the slit portion 51 includes the electric wire insertion slit portion 52 having a wide opening width and the narrow slit portion 53 having a narrower width than the electric wire insertion slit portion 52. Thus, the terminal spacer 50 can be attached to the electric wire W in a manner such that the electric wire W is inserted from the electric wire insertion slit portion 52, and the partly-inserted electric wire W is pushed against the narrow slit portion 53 to open it so that the electric wire W enters the terminal spacer 50. As a result, the operator can attach the terminal spacer 50 to the electric wire W without applying excessive external force to the terminal spacer 50. In addition, the terminal spacer 50 attached to the electric wire W is prevented from easily coming off the electric wire W and the electric wire connecting portion of the terminal through the slit portion 51 due to the narrow slit portion 53, compared with the conventional case where the terminal spacer 50 includes the electric wire insertion slit portion 52 extending across the entire terminal spacer 50. Accordingly, the terminal spacer 50 contributes to facilitating the operation of attachment to the charge terminal 20A and does not easily come off the charge terminal 20A after the attachment thereto.

According to the present embodiment, the electric wire W can be easily inserted into the electric wire insertion slit portion 52 since the electric wire insertion slit portion 52 is open to the end surface 50A of the terminal spacer 50. Accordingly, the operation performance of attachment of the terminal spacer 50 to the charge terminal 20A is further improved.

According to the present embodiment, the electric wire W inserted in the electric wire insertion slit 52 can smoothly enter the narrow slit portion 53 since the electric wire insertion slit portion 52 has the tapered surface 52A. Accordingly, the operation performance of attachment of the terminal spacer 50 to the charge terminal 20A is further improved.

According to the present embodiment, since the waterproof rubber 60 comes into contact with the terminal spacer 50 via the rubber receiving wall portion 55, the contact area between the terminal spacer 50 and the waterproof rubber 60 increases. Even when the waterproof rubber 60 coming into contact with the rubber receiving wall portion 55 is made of a material having less rigidity, the waterproof rubber 60 reliably comes into contact with the terminal spacer 50. Accordingly, the waterproof rubber 60 can be prevented from entering the terminal spacer 50 even when rearward external force is applied to the charge terminal 20A at the time of contact (insertion) between the charge terminal 20A and the mating terminal.

According to the present embodiment, the terminal spacer 50, the waterproof rubber 60 and the rubber receiving plate 70 are interposed between the terminal receiving wall 16 of the connector case 10 and the contact claw 23 of the charge terminal 20A. Thus, the charge terminal 20A can be positioned and fixed to the electric wire insertion slit portion 52 without being provided with a lance at the charge terminal 20A or the electric wire insertion slit portion 52.

According to the present embodiment, the waterproof rubber 60 is placed between the terminal spacer 50 and the terminal receiving wall 16 so as to prevent water from entering the terminal housing portion 26 from the terminal receiving wall 16.

According to the present embodiment, the rubber receiving plate 70 is placed between the waterproof rubber 60 and the terminal receiving wall 16 so as to prevent the waterproof rubber 60 from entering the electric wire insertion hole 16A even when rearward external force is applied to the charge terminal 20A at the time of contact (insertion) between the charge terminal 20A and the mating terminal.

Modified Example

Figure 9:
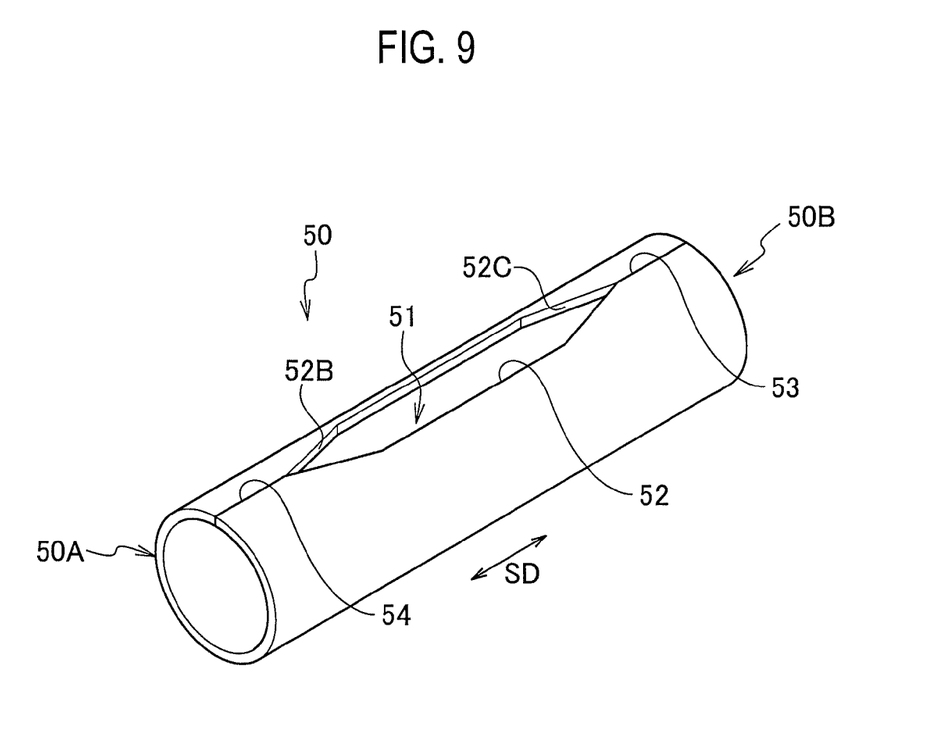
FIG. 9 is a perspective view showing a terminal spacer according to a modified example of the present embodiment.

Next, a modified example of the terminal spacer 50 according to the embodiment described above will be described below with reference to the drawing. FIG. 9 is a perspective view showing the terminal spacer 50 according to the modified example of the present embodiment. Note that the same elements as those of the terminal spacer 50 according to the embodiment described above are indicated by the same reference numerals, and different elements will be mainly described below.

The shape of the slit portion 51 of the terminal spacer 50 in the modified example is different from that in the embodiment described above. In particular, as shown in FIG. 9, the slit portion 51 includes the electric wire insertion slit portion 52 and narrow slit portions 53, 54. The electric wire insertion slit portion 52 is not open to end surfaces 50A, 50B in the axial direction SD of the terminal spacer 50. In other words, the end surfaces 50A, 50B are provided with the narrow slit portions 53, 54, respectively, and the electric wire insertion slit 52 is provided between the narrow slit portions 53, 54. The electric wire insertion slit portion 52 has tapered surfaces 52B, 52C each having an opening width which gradually decreases toward the respective narrow slit portions 53, 54.

When the terminal spacer 50 having such a configuration is attached to the electric wire W, the electric wire W is first bent to form a curved portion, the curved portion is inserted into the terminal spacer 50 from the electric wire insertion slit portion 52, and the inserted curved portion is opened and pushed against the tapered surfaces 52B, 52C and the narrow slit portions 53, 54 in this order to open the narrow slit portion 53 so that the electric wire W enters the terminal spacer 50. Thus, the terminal spacer 50 is attached to the electric wire W with the electric wire connecting portion 22 of the charge terminal 20A partly covered.

According to the modified example, the terminal spacer 50 contributes to facilitating the operation of attachment to the charge terminal 20A and does not easily come off the charge terminal 20A after the attachment thereto, as in the case of the embodiment described above.

Other Embodiments

Although the details of the present invention have been disclosed by way of the embodiment described above, the present invention should not be deemed to be limited to the descriptions and the drawings composing part of the disclosure. It will be apparent to those skilled in the art from the disclosure that various alternative embodiments, examples and implementations can be made.

For example, the embodiment of the present invention may be subjected to modification in the following points. The terminal spacer 50 is not limited to the above-described case where the terminal spacer 50 is provided in the charge connector 1, and the terminal spacer 50 may be provided in other connectors or devices such as a charge inlet device as long as the charge terminal 20A is positioned and fixed to the connector housing 20B.

The electric wire insertion slit portion 52 is not limited to the above-described case where the opening width thereof excluding the tapered surface 52A is set to be greater than the diameter of the electric wire W, and the opening width may be set to be slightly smaller than the diameter of the electric wire W.

The narrow slit portion 53 is not limited to the above-described case where the opening width thereof is set to be approximately zero as long as the opening width is set to be smaller than the diameter of the electric wire W.

The rubber receiving wall portion 55 is not limited to the above-described case where the rubber receiving wall portion 55 is formed on the end surface 50A of the terminal spacer 50. For example, when the attachment direction of the terminal spacer 50 is the opposite direction, the rubber receiving wall portion 55 may be formed on the end surface 50B of the terminal spacer 50 as long as the rubber receiving wall portion 55 is located adjacent to the waterproof rubber 60.

The rubber receiving wall portion 55 is not limited to the above-described case where the rubber receiving wall portion 55 is brought into contact with the waterproof rubber 60, and the rubber receiving wall portion 55 may directly come into contact with the terminal housing portion 26. Here, the rubber receiving wall portion 55 is not necessarily provided in the terminal spacer 50.

The present invention can, of course, include various embodiments not described in this specification. Therefore, the scope of the present invention is defined only by the appropriate features according to the claims in view of the descriptions made above.

What is claimed is:

1. A terminal spacer having a cylindrical shape to be attached to a circumference of an electric wire connected to a terminal, the terminal spacer comprising
a slit portion extending across the entire length in an axial direction of the terminal spacer,
the slit portion including:
an electric wire insertion slit portion into which the electric wire can be inserted; and
a narrow slit portion continuously extending from the electric wire insertion slit portion, having an opening width narrower than that of the electric wire insertion slit portion and having a longitudinal length less than half of a longitudinal length of the terminal spacer.

2. The terminal spacer according to claim 1, wherein the electric wire insertion slit portion is open to an end surface of the terminal spacer on one side in the axial direction.

3. The terminal spacer according to claim 1, wherein the electric wire insertion slit portion has a tapered surface having an opening width which gradually decreases toward the narrow slit portion.

4. The terminal spacer according to claim 1, wherein the end surface of the terminal spacer is provided with a receiving wall portion projecting in an inner circumferential direction.

5. The terminal spacer according to claim 1, further comprising:
a second narrow slit portion at one end of the terminal spacer opposing another end of the terminal space at which the narrow slit portion is located, wherein
the electric wire insertion slit portion is between the narrow slit portion and the second narrow slit portion.

6. The terminal spacer according to claim 5, wherein the electric wire insertion slit portion further comprises tapered surfaces each having an opening width which gradually decreases toward a respective one of the narrow slit portion and the second narrow slit portion.

7. The terminal spacer according to claim 1, wherein side walls of the narrow slit portion are in contact with each other.

* * * * *